UNITED STATES PATENT OFFICE.

HARRY A. BABIS, OF PHILADELPHIA, PENNSYLVANIA.

COATING COMPOSITION.

1,330,421.      Specification of Letters Patent.      Patented Feb. 10, 1920.

No Drawing.      Application filed April 10, 1919. Serial No. 288,943.

*To all whom it may concern:*

Be it known that I, HARRY A. BABIS, a subject of the present Government of Russia, having declared my intention of becoming a citizen of the United States, and now residing in the city and county of Philadelphia, State of Pennsylvania, have invented a new and useful Coating Composition, of which the following is a specification.

The object of my invention is the making of a composition of matter in liquid form, which shall be applicable, particularly, for filling in cavities in the surfaces of metals and at the same time serve as a water-proof covering or paint for such surfaces, to preserve them from rust.

My composition consists of solutions of the following ingredients compounded and commingled in any preferred way:—

First:—Canadian or Burgundy pitch, dissolved in alcohol, ether or acetone.

Second:—Celluloid dissolved in acetone.

Third:—A metallic or chemical coloring matter.

Fourth:—Japan is added to make the surface much more durable and less affected by heat.

For certain uses, I add rosin to the first named solution and add to the solution so formed the second solution above named.

While I do not, of course, desire to limit myself to absolutely definite quantities of the ingredients I use, I find that to make, for instance, one hundred pounds of my composition, I can use approximately in the first solution which contains the pitch, thirty pounds of the pitch and 60 pounds of the solvent of alcohol, ether or acetone,— adding thereto seven pounds of the second or dissolved celluloid solution, and three pounds of japan.

When, upon the other hand, my composition is to be made from a first solution containing rosin and pitch, instead of pitch alone, the proportions to which I resort for the making of a given one hundred pounds, are, pitch, alone, fifteen pounds,—rosin alone, fifteen pounds,—ether, acetone or alcohol, sixty pounds,—and added thereto seven pounds of the celluloid solution, and three pounds of japan.

When it is desired to use my composition not only as a filler, but also as a coloring composition, I introduce within and throughout the ultimate commingled solution, either metallic or chemical coloring matter of the desired proportions and tints.

It will now be apparent that I have devised a novel and useful construction of a liquid composition which embodies the features of advantages enumerated as desirable in the statement of the invention and the above description, and while I have, in the present instance, shown and described a preferred embodiment thereof which will be found in practice to give satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:—

1. A liquid composition adapted as a filler to finish metallic surfaces and serve as a coating therefor comprising, Burgundy pitch, ether, japan, celluloid, and acetone.

2. A liquid composition adapted as a filler to finish metallic surfaces and serve as a coating therefor comprising, rosin, Burgundy pitch, ether, japan, celluloid, and acetone.

3. A liquid composition adapted as a filler to finish metallic surfaces and serve as a coating therefor comprising, fifteen per cent. of pitch, fifteen per cent. of rosin, sixty per cent. of ether, three per cent. of japan, seven per cent. of celluloid, and acetone.

HARRY A. BABIS.

Witnesses:
E. HAYWARD FAIRBANKS,
HARRY M. FRIEDENBERG.